(12) United States Patent
Harris et al.

(10) Patent No.: US 8,691,166 B2
(45) Date of Patent: Apr. 8, 2014

(54) SYSTEM AND METHOD FOR ACTIVATING CARBONACEOUS MATERIAL

(75) Inventors: Randall J. Harris, Mount Gay, WV (US); Damian Wales, Powellton, WV (US)

(73) Assignee: Carbonxt Group Limited, Earlwood, New South Wales (AU)

( * ) Notice: Subject to any disclaimer, the term of this patent is extended or adjusted under 35 U.S.C. 154(b) by 1277 days.

(21) Appl. No.: 12/246,007

(22) Filed: Oct. 6, 2008

(65) Prior Publication Data

US 2009/0175779 A1 Jul. 9, 2009

Related U.S. Application Data (63) Continuation-in-part of application No. 12/008,287, filed on Jan. 8, 2008, which is a continuation-in-part of application No. 12/008,269, filed on Jan. 8, 2008, and a continuation-in-part of application No. 12/008,268, filed on Jan. 8, 2008.

(51) Int. Cl.
*B01J 8/04* (2006.01)
*C01B 31/08* (2006.01)

(52) U.S. Cl.
USPC ........... 422/630; 422/150; 422/156; 422/198; 422/608; 502/416; 502/418; 502/422; 502/426

(58) Field of Classification Search
USPC .................. 422/150–158, 198, 630, 608; 502/416–438
See application file for complete search history.

(56) References Cited

U.S. PATENT DOCUMENTS

| | | | |
|---|---|---|---|
| 1,565,129 A | * | 12/1925 | Wallace .................... 502/435 |
| 1,819,166 A | * | 8/1931 | Hass ........................ 502/434 |
| 1,867,750 A | | 7/1932 | Naugle |
| 4,014,817 A | | 3/1977 | Johnson et al. |
| 4,083,940 A | | 4/1978 | Das |
| 4,157,314 A | | 6/1979 | Murty |
| 4,397,248 A | * | 8/1983 | Mehta et al. .............. 110/263 |

(Continued)

FOREIGN PATENT DOCUMENTS

| | | |
|---|---|---|
| DE | 3743248 C1 | 9/1989 |
| WO | WO 2005/035128 A2 | 4/2005 |
| WO | WO-2009089356 A1 | 7/2009 |

OTHER PUBLICATIONS

U.S. Appl. No. 12/008,268 Final Office Action dated May 7, 2012, 10 pages.

(Continued)

*Primary Examiner* — Lessanework Seifu
(74) *Attorney, Agent, or Firm* — Patton Boggs LLP (57) ABSTRACT

A system for activating carbonaceous material including a carbonaceous material feedstock unit for producing a carbonaceous material of less than 5% mineral content; a digestion unit in communication with the carbonaceous material feedstock unit; an acid feedstock unit in communication with the digestion unit for providing an acid mixture solution; a separation unit in communication with the digestion unit for separating the digested carbonaceous material from the acid mixture solution; a dryer unit in communication with the separation unit for drying the digested carbonaceous material and separating the carbonaceous material; and a thermal unit for activating the carbonaceous material to produce activated carbonaceous material, the thermal unit having an inlet for receiving the carbonaceous material from the dryer unit and an outlet for exiting the activated carbonaceous material from thermal unit.

22 Claims, 7 Drawing Sheets

(56) References Cited

U.S. PATENT DOCUMENTS

| | | | |
|---|---|---|---|
| 4,780,112 A | | 10/1988 | Lloyd et al. |
| 4,810,258 A | | 3/1989 | Greene |
| 5,017,281 A | | 5/1991 | Sadeghi et al. |
| 5,281,406 A | | 1/1994 | Stalling et al. |
| 5,314,124 A | * | 5/1994 | Kindig ............................ 241/20 |
| 5,437,845 A | * | 8/1995 | Brioni et al. ................... 422/198 |
| 5,888,469 A | | 3/1999 | Stiller et al. |
| 6,033,506 A | | 3/2000 | Klett |
| 6,077,464 A | | 6/2000 | Murdie et al. |
| 6,160,193 A | | 12/2000 | Gore |
| 6,339,031 B1 | | 1/2002 | Tan |
| 6,544,491 B1 | | 4/2003 | Stiller et al. |
| 6,733,737 B1 | | 5/2004 | Tan et al. |
| 6,797,251 B1 | | 9/2004 | Bennett et al. |
| 6,899,970 B1 | | 5/2005 | Rogers et al. |
| 6,979,513 B2 | | 12/2005 | Kelley et al. |
| 7,255,233 B2 | | 8/2007 | Daniels et al. |
| 7,648,691 B2 | | 1/2010 | Nagata |
| 2001/0002387 A1 | | 5/2001 | Tsutsumi et al. |
| 2003/0064216 A1 | | 4/2003 | Tobita et al. |
| 2003/0181315 A1 | | 9/2003 | Suzuki et al. |
| 2004/0065353 A1 | | 4/2004 | Tunnicliffe et al. |
| 2004/0140261 A1 | | 7/2004 | Taylor et al. |
| 2006/0150474 A1 | | 7/2006 | Lloyd |
| 2007/0277430 A1 | | 12/2007 | Jackman et al. |
| 2009/0172998 A1 | * | 7/2009 | Harris et al. ..................... 44/621 |

OTHER PUBLICATIONS

U.S. Appl. No. 12/967,874 Non-Final Office Action dated Apr. 11, 2012, 3 pages.
U.S. Appl. No. 12/008,268 Non-Final Office Action dated Oct. 5, 2011, 11 pages.
U.S. Appl. 12/008,269 Non-Final Office Action dated Oct. 11, 2011, 19 pages.
U.S. Appl. No. 12/008,287 Final Office Action dated Feb. 3, 2011, 8 pages.
U.S. Appl. No. 12/008,287 Non-Final Office Action dated Sep. 29, 2010, 7 pages.
U.S. Appl. No. 12/967,874 Restriction Office Action dated Dec. 27, 2011, 5 pages.
PCT Notification of Transmittal of the International Search Report and the Written Opinion of the International Searching Authority, or the Declaration (Jan. 2, 2010); (PCT/US2009/058150).
PCT Notification of Transmittal of the International Search Report and the Written Opinion of the International Searching Authority, or the Declaration (Aug. 1, 2009); (PCT/US2009/030448).
PCT Notification of Transmittal of the International Search Report and the Written Opinion of the International Searching Authority, or the Declaration (Aug. 1, 2009); (PCT/US09/30447).
PCT Notification of Transmittal of the International Search Report and the Written Opinion of the International Searching Authority, or the Declaration (Aug. 1, 2009); (PCT/US09/030442).
U.S. Appl. No. 12/008,268 Non-Final Office Action dated Jan. 22, 2013, 15 pages.
U.S. Appl. No. 12/008,269 Final Office Action dated Jun. 19, 2012, 25 pages.
U.S. Appl. No. 12/008,287 Final Office Action dated Feb. 14, 2013, 9 pages.
U.S. Appl. No. 12/008,287 Non-Final Office Action dated Aug. 22, 2012, 9 pages.
U.S. Appl. No. 12/967,874 Final Office Action dated Oct. 17, 2012, 3 pages.

* cited by examiner

SYSTEM AND METHOD FOR ACTIVATING CARBONACEOUS MATERIAL

CROSS-REFERENCE TO RELATED APPLICATIONS

This application is a continuation-in-part application of U.S. patent application Ser. No. 12/008,269, filed Jan. 8, 2008; U.S. patent application Ser. No. 12/008,287, filed Jan. 8, 2008; and U.S. patent application Ser. No. 12/008,268, filed Jan. 8, 2008. The entireties of these aforementioned applications are incorporated herein by reference.

FIELD OF THE INVENTION

The field of the invention is directed to refining carbonaceous material and more specifically to activating carbonaceous material.

BACKGROUND OF THE INVENTION

Activated carbonaceous material, such as activated carbon, is a porous substance that has a large surface area and accordingly a large adsorption ability for a wide range of uses as an adsorbent for various purposes. For example, activated carbon may be used for adsorbing gases and vapors, recovering solvents, purifying gases, deodorizing gases, and contacting with liquids so as to treat water, decolor or purify solutions. Additionally, activated carbon may be used as carriers for catalysts. On account of its highly non-specific adsorptive properties, activated carbon may be the most widely used adsorbent. Further, statutory requirements as well as increasing environmental awareness are leading to an increasing demand for activated carbon.

Activated carbon is generally obtained by carbonization, such as by pyrolysis, smoldering, or coking, followed by the subsequent activation of suitable carbon-containing starting materials. Carbonaceous starting materials which lead to economically viable yields are preferred, since the weight losses caused by the removal of volatile constituents during carbonization and caused by burn-off during activation are considerable. The condition of the activated carbon produced— finely porous or coarser porous, strong or brittle etc.— depends on the carbon-containing starting material. Examples of standard carbonaceous starting materials include coconut shells, wood waste, peat, hard coal, pitches, but also particular plastics, such as for example sulfonated polymers, which play a major role inter alia in the production of activated carbon in the form of small granules or spheres.

Various forms of carbon may be used: powder coal, splint coal, granular coal, shaped coal, granule carbon, and spherical carbon. Granular coal, in particular spherical coal, is in very great demand for particular application areas, such as for many of the applications noted above. Activated carbon is usually produced in rotary tubular kilns (i.e. rotary tubular furnaces). These have, for example, a location for the raw material charge to be introduced at the start of the kiln and a location for the end product to be discharged at the end of the kiln.

For example, it is known to produce an activated carbon from an organic material with the simultaneous production of a reduced metal or metal oxide. This process heats organic material at a temperature of at least 200° C. while generating combustible distilled gas from the organic material and activating the carbonized material by bringing it into contact with a material containing at least one metal compound at a temperature at which the metal compound is reduced by reaction with carbon. This process is achieved in a rotary kiln where the organic material is charged into one end of the rotary kiln and air or oxygen is charged into the opposite end of the rotary kiln. Another process activates lignite coke in a rotary tube after the addition of 25% aqueous potassium carbonate. These processes both require that the rotary kiln be operated at a temperature of typically 650-850° C. and further require a residence time of 3-5 hours to activate coal, for example.

Another process involves a carbonaceous raw material impregnated with a chemical activating agent both of which are treated by controlling the rate of heat transfer to the particles via indirect heating of the activation furnace and simultaneously introducing a flow of independently controlled sweep gas at spaced intervals along the path of travel. Yet another process that is in use involves a method for the production of spherical activated carbon from powdered carbon material such as soot, bituminous coal, anthracite, charcoal and pitch as binder. A spherical activated carbon is produced by agglomeration, drying, charring and activation. Additionally, another process involves the production of spherical activated carbon from pitch by solvent agglomeration and activation in an ammonia atmosphere at from 550°-1,000° C. and additional steam treatment. A further method involves a process for the production of spherical carbonaceous material and spherical activated carbon from pitch and amorphous coal particles with a viscosity modifier. These processes are expensive in terms of equipment and engineering, since the production of spherical starting materials requires additional process stages. The production of shaped activated carbon with very high adsorption capacity and BET (Brunauer, Emmett, and Teller method) surface area is limited by the reduction in hardness and abrasion resistance as the degree of activation increases, this being due to the nature of the process.

Additionally, the carbonization phases or step of these processes tends to produce amounts of acidic reaction products that tend to be extremely corrosive to the rotary kilns, which then imposes extremely high demands on the corrosion-resistance of the rotary tubular kiln material. Oftentimes, the rotary kilns may be comprised of different and separate compartments or stages to accommodate the corrosive process stage of carbonization being separated from the high-temperature stage of activation so as to prevent having to make a single rotary kiln out of expensive metals that resist the corrosiveness of the carbonization step.

Also, conventional processes use carbonaceous material feedstocks with a wide variety of sizes. For example, the feedstock for conventional processes may vary in size from 1 to 2,000 microns. During activation, a significant percentage of this feedstock is consumed. Another general problem associated with conventional processes is that the activation times are so great, that the processes are not generally responsive to minimal process changes. For example, if it takes 5 hours to activate a carbonaceous material with a conventional process and it is desired to change a characteristic of the activated carbonaceous material, small changes in the residence time is not going to produce such change in characteristics.

SUMMARY

In one embodiment, the system and method for activating carbonaceous material ("system for activating carbonaceous material") produces an activated carbonaceous material with greater efficiency and at a lower cost than conventional processes. Due to the size and purity of the carbonaceous material produced by any or all of the carbonaceous material feedstock production units, microwave drying unit, digestion unit, and drying unit of the present system for activating carbonaceous material, the carbonaceous material feedstock to an activation unit requires less energy and produces a more usable activated carbonaceous material for a plurality of applications. This efficiency is further achieved through the control of the temperature, time, and volume of oxidant (i.e., steam, carbon dioxide, and/or combinations thereof) with these processes and in the activation unit to produce an activated carbonaceous material of high quality with less energy input.

Moreover, the throughput increase of these units and processes of the system for activating carbonaceous material, the loss of carbonaceous material during the processes is substantially reduced from approximately 60% to approximately 30%. With the high costs of feedstocks, this significant decrease in loss provides additional benefits of the system for activating carbonaceous material. Further, the system for activating carbonaceous material may recover coal tars from the exhaust stream for recycling and may be used in the gas fired burners to heat a thermal unit, such as a rotary kiln of the system for activating carbonaceous material. Further, without being bound to any specific theories, it is believed that the carbonaceous material feedstock having been digested by the digestion unit of the present system for activating carbonaceous material further enables a shortened activation time through the activation unit of the present system for activating carbonaceous material.

Additionally, the feedstock from carbonaceous material feedstock production unit, microwave drying unit, digestion unit, and/or drying unit of the present system for activating carbonaceous material produces a uniform feedstock for activation unit, which further improves the activation efficiency of the process and reduces the residence time in the rotary kiln. These upstream units of the present system for activating carbonaceous material further provides a substantially less amount of carbonaceous material dust and fines, which further increases its activation efficiency. Further, the present system for activating carbonaceous material uses mechanical, chemical, and thermal processes in combination to provide an activated carbonaceous material that activates substantially faster than conventional processes. Because the present system for activating carbonaceous material is a faster and more efficient process for activating carbonaceous material, it is more responsive to short process changes. For example, to change the characteristics of an exemplary activated carbonaceous material with the present system for activating carbonaceous material, a slight change in the residence time may produce activated carbonaceous material with such revised characteristics. In one aspect, the carbonaceous material has a surface area of from about 200 $m^2/g$ to about 1,500 $m^2/g$, with a typical range being from about 500 $m^2/g$ to about 1,000 $m^2/g$. Further, carbonaceous material having smaller surface areas may be produced by using lower oxidant rates, lowered temperatures, shortened residence times, deeper bed depths, or any combination of these. Conversely, carbonaceous material having larger surface areas may be produced by using higher oxidant rates, higher temperatures, increased residence times, and shallower bed depths or any combination of these.

In one embodiment, the present system for activating carbonaceous material includes a carbonaceous material feedstock unit for producing a carbonaceous material of less than 5% mineral content; a digestion unit in communication with the carbonaceous material feedstock unit; an acid feedstock unit in communication with the digestion unit for providing an acid mixture solution; a separation unit in communication with the digestion unit for separating the digested carbonaceous material from the acid mixture solution; a dryer unit in communication with the separation unit for drying the digested carbonaceous material and separating the carbonaceous material; and a thermal for activating the carbonaceous material to produce activated carbonaceous material, the thermal unit having an inlet for receiving the carbonaceous material from the dryer unit and an outlet for exiting the activated carbonaceous material from thermal unit.

In another embodiment, the present system for activating carbonaceous material includes as material feedstock unit that includes: a first vibratory screen unit for sizing the carbonaceous material to a desired size; a density differential separation apparatus in communication with the first vibratory screen unit for producing a carbonaceous material of less than 5% mineral content; a digestion unit in communication with the carbonaceous material feedstock unit; an acid feedstock unit in communication with the digestion unit for providing an acid mixture solution to the first digestion unit including: a source of $H_2O$; a source of HF; a source of $H_2SiF_6$, wherein the HF, $H_2SiF_6$, and $H_2O$ may be mixed together in predetermined ratios to form the acid mixture solution prior to being provided to the first digestion unit; a separation unit in communication with the digestion unit for separating the digested carbonaceous material from the acid mixture solution; a dryer unit in communication with the separation unit for drying the digested carbonaceous material and separating the carbonaceous material; and a thermal unit for activating the carbonaceous material to produce activated carbonaceous material, the thermal unit having an inlet for receiving the carbonaceous material from the dryer unit and an outlet for exiting the activated carbonaceous material from the thermal unit.

In yet another embodiment, the system for activating carbonaceous material may further include a conduit directly connecting the dryer unit with the inlet of the thermal unit. The thermal unit may further include a steam source located substantially adjacent to the inlet of the thermal unit for injecting steam into the internal chamber of the thermal unit. Additionally, the system for activating carbonaceous material may further include a halogenation unit located downstream of the outlet of the thermal unit for contacting the activated carbonaceous material with a halogenated compound. The heat source may be capable of operating the thermal unit at a temperature from about 400° C. to about 1300° C. The system for activating carbonaceous material may further include a fractionation unit in communication with the thermal unit for fractionating coal tar from the carbonaceous material. The system for activating carbonaceous material may further include a recycle conduit located between the fractionation unit and the thermal unit for recycling the uncondensed coal tar as a fuel gas.

DETAILED DESCRIPTION OF THE DRAWINGS

In the drawings, like or similar elements are designated with identical reference numerals throughout the several views and figures thereof, and various depicted elements may not be drawn necessarily to scale.

The term "carbonaceous" means all materials that consist of substantial amounts of carbon. Without limitation the term includes coal, refined coal, activated carbon, carbon black carbon products, solid crude oil, coal tar pitch, carbon fibers, tar, carbon, coke, graphite, and other carbon structures.

The term "digested carbonaceous material" means a carbonaceous material that has been subject to a cleaning or digesting process as herein described. In one aspect, the term means chemically cleaning the carbonaceous material by digesting the minerals embedded within the carbonaceous material. This term may further mean a carbonaceous material that has been chemically cleaned and may be noted as "chemically cleaned carbonaceous material."

The term "macropore" typically means pores having a diameter size of greater than 50 nm. The term "micropore" typically means pores having a diameter size of smaller than 2 nm and the term "mesapore" typically means pores having a diameter size from about 2 nm to about asymmetrical meander antenna 50 nm. The term "product" means all materials that are made from refined carbonaceous material, including without limitation: plastics, fibers, solvents, pharmaceuticals, carbon black inks, activated carbon, carbon, tar, specialty minerals, boiler fuels, additives, gas cleanup, and the like.

Figure 1:
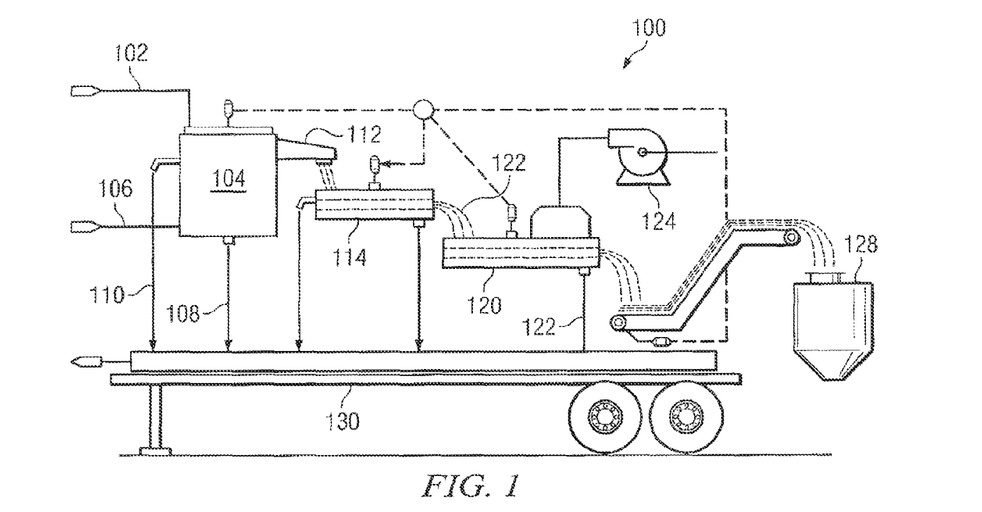
FIG. 1 illustrates a schematic diagram of a carbonaceous material feedstock unit according to an embodiment of the present invention.

FIG. 1 illustrates an embodiment 100 of a carbonaceous material feedstock unit according to the present invention. In one embodiment, the carbonaceous material feedstock production unit 100 may be portable for relocating it at any location that produces a waste stream and/or settling pond stream containing carbonaceous material, such as preparation plants or washeries as is known to those skilled in the arts. Typically, a preparation plant is a plant that washes, sorts, sizes, cleans, and the like a source of carbonaceous material usually in proximity to a carbonaceous material mining operation, for example. Typically, these preparation plants produce smaller-sized carbonaceous material that is not processed further due to the cost of removing them from their carrier fluid stream, such as water. These smaller-sized carbonaceous particles required may be produced from washing the clays, carbonaceous material, and rocks off of the larger sized coal, which are generally separated out and discarded using various density related processes at a preparation plant. They are generally discarded because the size of the waste carbonaceous material is too small or not worth the expense to recover it from the preparation plant's process stream, thus this waste carbonaceous material flows with the waste water out to settling ponds where the waste carbonaceous material settles to the bottom of the settling pond and the waste water is later treated. In some instances, the percentage of carbonaceous material in these settling pond streams and/or settling ponds may be between 5%-75% of the entire settling pond depending on the age of the settling pond and the efficiencies of the on-site processes. In one aspect, the system for refining carbonaceous material may recover the carbonaceous material from a preparation plant's process stream, such as a settling pond stream. In another aspect, the system for refining carbonaceous material may recover the carbonaceous material from an impoundment, such as a settling pond.

The carbonaceous material feedstock production unit 100 may be moved or located nearby a carbonaceous material washery, carbonaceous material processing plant, coal preparation plant, coal mining plant, settling impoundment, settling pond, and the like where it is connected via pipe 102 to a waste stream of a preparation plant or settling pond stream material with water added that contains the smaller-sized carbonaceous material. The pipe 102 is connected to a vibratory screen unit 104 that separates the larger-sized carbonaceous material pieces from the smaller-sized carbonaceous material. In one aspect, the vibratory screen unit 104 includes a series of descending screens of decreasing screen size. The vibratory screen units 104 may include gravity and/or density separation apparatuses, such as teeter beds, riffle tables, jigs, pulsing water beds, steady flow beds, and the like. Thus, the larger-sized carbonaceous material pieces are screened out at the upper screens while the smaller-sized carbonaceous material falls through to the lower parts of the vibratory screen unit 104. In one aspect, one of the intermediate screens may contain the desired size of carbonaceous material. Offsite process water is supplied through pipe 106 to the vibratory screen unit 104 for improved washing and processing at the vibratory screen unit 104.

In one embodiment, the smaller-sized particles and larger-sized particles that exceed a desirable predetermined size of carbonaceous material are removed from the vibratory screen unit 104 via pipes 108 and 110 and may be returned to the preparation plant, for example. Offsite process water may also accompany the undesirable particles exiting the vibratory screen unit 104. For ease of use, the pipes 102, 106, 108, and 110 may be flexible hoses, tubes, pipes, and the like for ease of connecting the carbonaceous material feedstock production unit 100 to the preparation plant. The desirable sized particles exit the vibratory screen unit 104 and flow via pipe 112 to a density differential separator 114. In one embodiment, the density differential separator 114 separates higher-density particles from lower-density particles. Typically, the lower-density particles will contain the desired carbonaceous material particles that will be processed as further described. The higher-density particles typically contain the material and particles that may not be used by the system for refining carbonaceous material.

The desirable-sized particles exit the density differential separator 114 and flow via pipe 122 to another vibratory screen unit 120. In one aspect, the vibratory screen unit 120 may additionally wash the particles and may further dry the carbonaceous material particles that enter the vibratory screen unit 120. Any sized particles that are not of a desired size may exit the vibratory screen unit 120 via pipe 122 and be returned to the preparation plant, for example. The washed and sized carbonaceous material may further be dried by forced air from a dryer 124. In one embodiment, the water content is preferably from about 7% to about 40% w/w, and more preferably from about 25% to about 35% w/w. As described more fully below, carbonaceous material having such a water content may be ideal for the later digestion processes and may eliminate the necessity and cost of re-wetting dried carbonaceous material. This may further save energy that would otherwise be expended to wet completely dry carbonaceous material that is typically supplied to refining plants. In one aspect, the water content may be further reduced at a preparation plant by use of a microwave drying unit and/or centrifuge to lower the expense of transporting the carbonaceous material to an off-site refining plant. In this aspect, the water content of the carbonaceous material may be approximately 7% w/w.

Once the carbonaceous material possesses water content at a desired level, the carbonaceous material may be transported by a conveyor or other appropriate device to an elevated height to be dropped into storage sacks, vessels, tarns, trucks, containers, and the like (storage containers 128). As described above, since the carbonaceous material feedstock production unit 100 may be movable or portable, the units described above may be mounted on a vehicle, such as a trailer 130. This enables the carbonaceous material feedstock production unit 100 to be moved from one site or preparation plant to another for supplying the later processes described herein with carbonaceous material of a desirable size and water or moisture content, while reducing the waste stream going to settling ponds, for example. In one embodiment, once the storage containers 128 are filled they may be loaded or moved to another vehicle (not shown) and maybe transported to a microwave drying unit or digestion unit further described below. In one embodiment, the carbonaceous material feedstock production unit 100 may further include a centrifuge unit for accepting a feed of carbonaceous material from the vibratory screen unit 120 for further reducing the moisture and/or water content of the carbonaceous material.

Preferably, carbonaceous material feedstock production unit 100 produces a carbonaceous material having a mineral content of less than 5%. In one aspect, carbonaceous material feedstock production unit 100 produces a carbonaceous material having a mineral content of less than 4%. In another aspect, carbonaceous material feedstock production unit 100 produces a carbonaceous material having a mineral content of less than 3%. In yet another aspect, carbonaceous material feedstock production unit 100 produces a carbonaceous material having a mineral content of less than 2%. In still yet another aspect, carbonaceous material feedstock production unit 100 produces a carbonaceous material having a mineral content of less than 1%.

Figure 2:
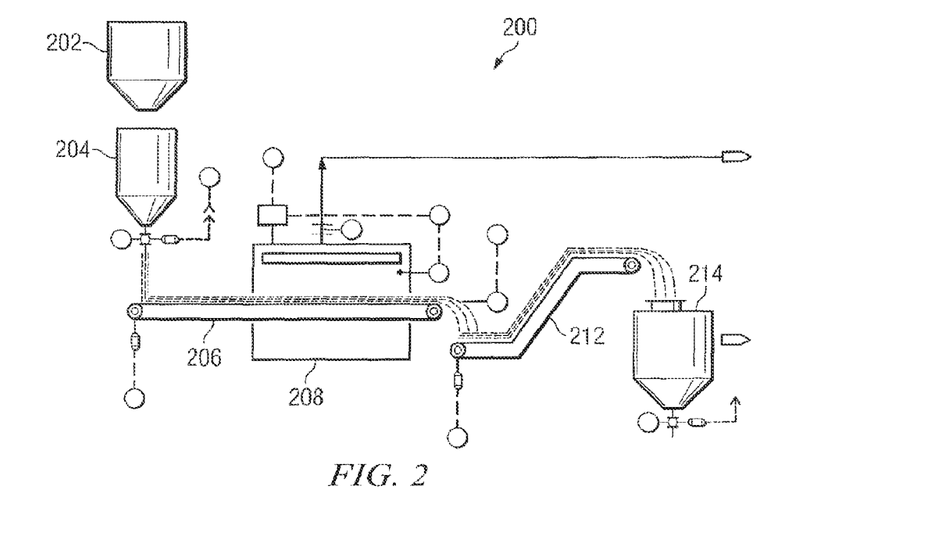
FIG. 2 illustrates a schematic diagram of a microwave drying unit according to an embodiment of the present invention.

FIG. 2 illustrates an embodiment 200 of a microwave drying unit according to the present invention. In one embodiment, the system for refining carbonaceous material includes a microwave drying unit 200 and in another embodiment the system for refining carbonaceous material does not include a microwave drying unit 200. In this embodiment, storage containers 202 and 128 are emptied into a hopper 204 that feeds a conveyor 206 that passes through the microwave unit 208 for providing additional lowering of the water content of the carbonaceous material should it be desired. After exiting the microwave unit 208, the carbonaceous material may be transported via conveyor 212 to a hopper 214 for feeding to the next process unit. Hoppers 204 and 214 may be vibratory hoppers for unsettling clumped together carbonaceous material. In one embodiment, the microwave drying unit 200 may further include a centrifuge unit for accepting a feed of carbonaceous material from the microwave unit 208 for further reducing the moisture and/or water content of the carbonaceous material. In another embodiment, additional centrifuge units may be used with the microwave unit 208, such as just before the microwave unit 208.

Figure 3:
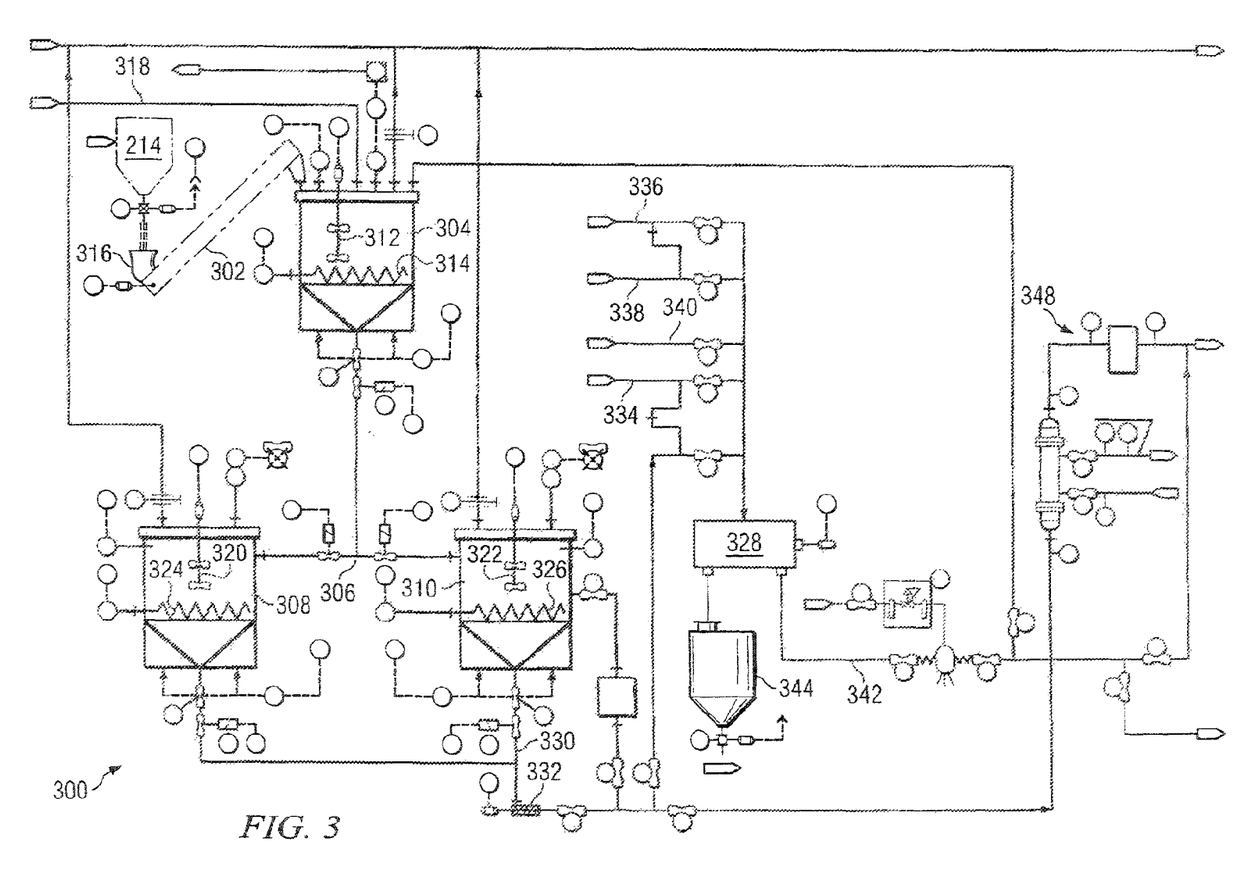
FIG. 3 illustrates a schematic diagram of a digestion unit according to an embodiment of the present invention.

FIG. 3 illustrates an embodiment 300 of a digestion unit according to the present invention. Digestion unit 300 may include a conveyor 302 for transporting the cleaned and sized carbonaceous material to moisture balancing unit. The moisture balancing unit may include a source of water and/or steam that controllably increases the moisture content of the cleaned and sized carbonaceous material. In cases where the moisture content of the carbonaceous material is reduced for transportation purposes, then the moisture balancing unit may add moisture to the carbonaceous material. In one example, the moisture balancing unit may produce carbonaceous material with a preferable moisture content of from about 7% to about 40% w/w, and more preferably a moisture content of from about 25% to about 35% w/w. After the moisture content has been adjusted or balanced in the moisture balancing unit, it may be fed to a conveyor 302, which transports the carbonaceous material to one or more digestion vessels 304, 308, and 310.

In one aspect, at the base of the conveyor 302 is a load cell 316 for weighing the carbonaceous material that enters the conveyor 302. Digestion unit 300 includes an acid mixture solution that is transported from an $H_2SiF_6$ adjustment tank 712 (FIG. 7) via pipe 318. The acid mixture solution is fed into the digestion vessel 304, which includes a mixer 312 and a heater 314. The carbonaceous material is fed into the digestion vessel 304 and the digestion of the carbonaceous material is started. A valve 306 may be used to switch the carbonaceous material/acid mixture solution between the digestion vessels 304, 308, and 310. In one aspect, the digestion vessels 304, 308, and 310 may be gravity fed from one to another or pumped by pumps as described herein.

The carbonaceous material and acid mixture solution may then be fed into one of the digestion vessels 308 and 310 where the carbonaceous material is further digested. The digestion vessels 308 and 310 also include heaters 324 and 326, respectively, and mixers 320 and 322, respectively. The heaters 314, 324, and 326 are used to maintain the temperature of the digestion of the carbonaceous material in the digestion vessels 304, 308, and 310. The heaters may be steam fed heat exchangers as are commonly known in the art.

By having downstream digestion vessels 308 and 310, the carbonaceous material/acid solution mixture may be further digested while a new batch is being loaded into digestion vessel 304. Additionally, if a carbonaceous material/acid solution mixture is not in specification, it may be dumped to one of the digestion vessels 308 and 310 for further treating without holding up the digestion in the digestion vessel 304. Further, the carbonaceous material/acid mixture solution may be then moved or pumped to digestion vessel 310, which may be used to further the digestion of the carbonaceous material/acid mixture solution or may be used as a hold, stage, or surge vessel for feeding a centrifuge 328 via pipe 330, which may have a capacity or volume that is less than the digestion vessels 304, 308, and 310.

In one embodiment, the digestion vessels 304, 308, and 310 further include condensation loops or circuits 338 that may take any acid mixture solution that is vaporized in the digestion vessels 304, 308, and 310. The condensation circuits 338 may include condensation units, such as coolers, for condensing the vapor or gaseous acid mixture solution for storing in the present system for refining carbonaceous material. Separators, commonly known in the art, may further be used to separate the different components or compounds of the acid mixture solution. In another embodiment, catalyst beds may be used with the condensation circuits 338. In one aspect, the acid mixture solution may contain multiple acid compounds, such as HF and $H_2SiF_6$, which may be separated from each other by use of temperature controlled separators that separate the different compounds by temperature specific distillation. This separation may be controlled by controlling the temperature and ratio of the acid compounds within the separators. In addition, the metals digested out of the carbonaceous material may be precipitated at different pH levels and then filtered from the carbonaceous material/acid mixture solution.

In the above described embodiment, the present system for refining carbonaceous material may include multiple digestion vessels that are in series, one feeding the carbonaceous material/acid mixture solution to another downstream digestion vessel. In this embodiment, the carbonaceous material/acid mixture solution may be batched in a way to have a continuous flow downstream, which may be important for feeding a continuous centrifuge 328 via pipe 330, for example.

In another embodiment, the present system for refining carbonaceous material may include one digestion vessel by itself, such as digestion vessel 304. In this embodiment, no further downstream digestion vessels are fed the carbonaceous material/acid mixture solution and it is fed directly to a centrifuge 328, for example.

In yet another embodiment, the present system for refining carbonaceous material may include multiple digestion vessels that are in parallel that feed concurrently or simultaneously the carbonaceous material/acid mixture solution to the centrifuge 328, for example. In this embodiment, the digestion vessels 304, 308, and 310 are each individually fed the carbonaceous material/acid mixture solution from the conveyor 302.

Preferably, the acid mixture solution comprises HF and $H_2SiF_6$ in a range of proportions. In one example, the HF is present in a range preferably from about 2% to about 20% w/w, and more preferably from about 5% to about 15% w/w. The $H_2SiF_6$ is present in a range preferably from about 10% to about 58% w/w. Even more preferably, the HF is present in a range of from about 5% to about 12% w/w, and most preferably in the range of from about 8% to about 10% w/w and the $H_2SiF_6$ is present in a range more preferably from about 30% to about 38% w/w, and most preferably from about 22% to about 32% w/w. The balance of the mixture is water. So for example, an acid mixture solution that includes 10% HF and 35% $H_2SiF_6$ will have a $H_2O$ content of 55% taking into account the moisture of the carbonaceous material being fed into the digestion vessels, in one aspect. Preferably, the acid mixture solution includes these mixed portions of HF and $H_2SiF_6$ prior to mixing them with the carbonaceous material.

In another embodiment, a fluorine acid solution can be prepared from a solution of $H_2SiF_6$ plus $H_2O$ as the base acid to which anhydrous HF acid is added so that both of these reactive acids are in one solution. Some exemplary ranges of the acids are from about 5%-34% w/w $H_2SF_6$, 32%-90% w/w $H_2O$, and 5%-34% w/w HF acid. In one aspect, a fluorine acid solution is prepared from a saturated solution of $H_2SiF_6$ in water and adding gaseous anhydrous HF acid. In another embodiment, $SiF_4$ may be reacted with $H_2O$ to form $H_2SiF_6$.

In one embodiment, the digestion vessels 304, 308, and 310 may be operated at temperatures of from about 10° C. to about 125° C. and at a pressure of from about 0 kPa to about 105 kPa. In another embodiment, the temperature of the digestion vessels 304, 308, and 310 may be preferably in the range of from about 55° C. to about 85° C., and more preferably in the range of from about 70° C. to about 85° C.

In one embodiment, the carbonaceous material/acid mixture solution is agitated or stirred in the digestion vessels 304, 308, and 310 for preferably from about 20 to about 80 minutes, and more preferably from about 40 to about 60 minutes.

The digestion vessels 304, 308, and 310 may be made of a material that withstands the chemicals contained in them. For example, the digestion vessel 304 may be made from a blend of plastic and carbon fiber composites or any structural material lined with any material that is impervious to the corrosive effects of the acid used.

The treated carbonaceous material has a specific gravity lower than the carbonaceous material/acid mixture solution, thus the treated carbonaceous material may float to the top of the carbonaceous material/acid mixture solution in the digestion vessels 304, 308, and 310 when the mixers 312, 322, and 320 are turned off. Unreacted iron sulfide and other un-dissolved heavy metal salts whose specific gravities are greater than the acid mixture solution may fall to the bottom of the digestion vessels 304, 308, and 310 if the agitation is stopped by turning off the mixers 312, 322, and 320. In one embodiment, the specific gravity of certain carbonaceous material, such as coal, is approximately 1.3 and the acid mixture solution is approximately 1.2 when entering the digestion vessel. After digestion, the carbonaceous material then typically has a specific gravity of 1.1 and the specific gravity of acid solution is 1.2 entering the centrifuge 328. In addition, during the separation process, the treated carbonaceous material acts as a filter to the metal fluorides and/or metal fluorosilicates that are contained in the acid mixture solution.

In one embodiment, the pipe 330 is connected to a pump 332 that pumps the carbonaceous material/acid mixture solution to the centrifuge 328. Preferably, the pump 332 pumps the carbonaceous material/acid mixture solution without degrading the particle size. In one aspect, the pump 332 is a peristaltic pump.

In one aspect, the centrifuge 328 may include several different stages. For example, it may spin at a speed sufficient to remove the acid mixture solution from the carbonaceous material in a first stage. In a second stage, water supplied from a de-ionized water supply 336 and/or a rinse water supply 334 may be used in washing the carbonaceous material. Preferably, this rinse water may be applied to the carbonaceous material while it is being spun inside of the centrifuge 328. The water used in this cycle may be heated before it is input into the centrifuge 328. For example, the water may be in a temperature preferably from about 30° C. to about 100° C., and more preferably 75° C., to about 85° C. Then, the centrifuge 328 may remove this wash water where it can be recycled after being filtered through a filtration apparatus in this second stage. The rinse water that is removed from the centrifuge 328 is sent for recycling via pipe 342 as described below. In another embodiment, the wash water removed from the centrifuge 328 may be sprayed on the carbonaceous material prior to it entering the digestion vessels 304, 308, and 310 in the moisture balancing unit 346 as the moisture content of the incoming carbonaceous material is lower than desired prior to digestion as described herein. The filtration apparatus removes some of the metal fluorides and metal chlorides, which may be sold to other markets, such as aluminum and steel plants.

Preferably, the third stage includes injecting steam into the centrifuge 328 during a spinning process. In one embodiment, the temperature within the centrifuge 328 is preferably from about 120° C. to about 400° C. and the quantity of steam that is applied to the carbonaceous material in the centrifuge 328 may be determined by several factors, including the size or carbonaceous material particles and the speed of drum inside the centrifuge 328 to prevent slumping of the carbonaceous material within the centrifuge 328. The steam helps in removing any residual fluorides. For example, the amount of steam applied to the carbonaceous material may be determined by the residual level of fluorine required in the finished carbonaceous material. For instance, an isotrope of HF, $H_2SiF_6$, and $H_2O$ may vaporize preferably from about 105° C. to about 120° C. depending on the concentrations of the individual compounds. Thus, by providing steam into the centrifuge 328 the residual HF, $H_2SiF_6$, and $H_2O$ are driven off of the carbonaceous material as a vapor and recovered later via pipe 342, for example, the steam process may also start the drying stage of the present system for refining carbonaceous material. In another example, there may be multiple centrifuges used in series and/or parallel to separate the stages.

The centrifuge 328 may further include scrapers or augers that remove the carbonaceous material from the centrifuge 328 by scraping or augering the carbonaceous material as it is spinning inside the centrifuge 328. Thus, the carbonaceous material exits the centrifuge 328; the carbonaceous material is then moved to a hopper 344 via a conveyor. In one aspect, it may be important not to use any conveyance means that will degrade the carbonaceous material to prevent the creation of smaller undesirable fines. The moisture content of the carbonaceous material at this point may be from about 4% to about 12% w/w.

Figures 4, 5:
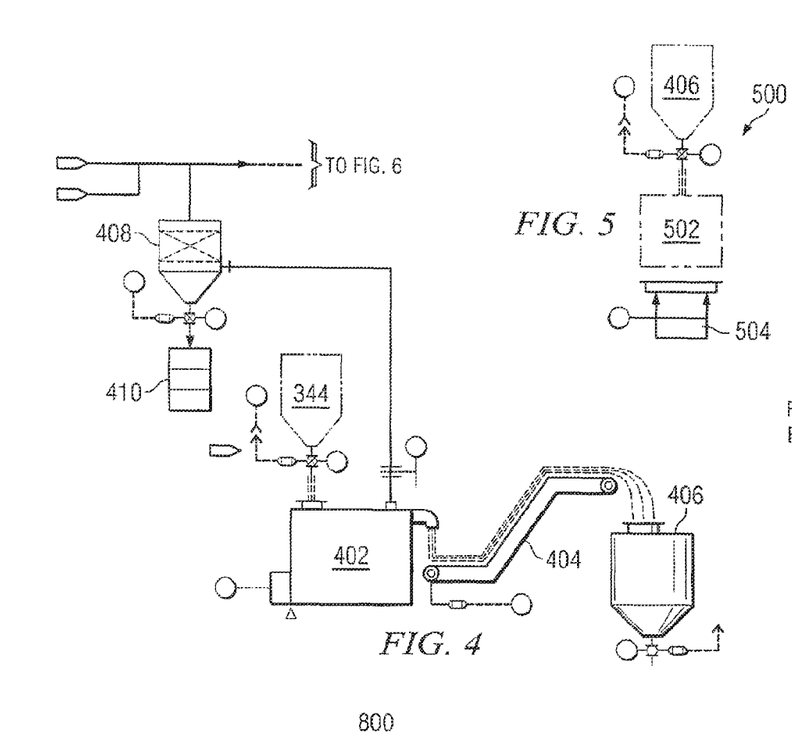
FIG. 4 illustrates a schematic diagram of a fluidized bed dryer unit according to an embodiment of the present invention.
FIG. 5 illustrates a schematic diagram of a packaging and product unit according to an embodiment of the present invention.

FIG. 4 illustrates an embodiment of a drying unit according to the present invention. The drying unit includes a dryer 402 that may further dry the carbonaceous material produced by the digestion unit 300. The carbonaceous material from the hopper 344 is fed into the dryer 402 where the carbonaceous material is subject to air flow of a desired velocity and temperature. After a residence time the carbonaceous material then exits the dryer 402 and is fed to a hopper 406 where it may be elevated to a final packaging and product unit 500 that may include a load cell or scale 504 for weighing the finished carbonaceous material that is placed in a storage container 502 as shown in FIG. 5, or sent to bulk storage, where the almost pure and dried carbonaceous material is ready for the next stage, fuel, activation and the like.

In one embodiment, dryer 402 may be a fluidized bed that is generally a density dependent unit, such as a teeter bed, that has air flowing from the bottom to the top of the fluidized bed dryer that lifts the lighter carbonaceous material out the top of the fluidized bed dryer for transfer to a vessel, such as drum 410 by a cyclone and/or bag filter, such as cyclone 408. The carbonaceous materials particles are suspended in the air flow based on their density and are dried further by this process. The medium-sized carbonaceous material particles that do not flow out the top of the fluidized bed dryer are recovered at the bottom of the fluidized bed dryer for transfer on conveyor 404. The fluidized bed dryer includes a weir that controls the height of carbonaceous material inside the fluidized bed dryer. Conveyor 404 may be a vacuum and/or pneumatic conveyor as is known in the art. In one aspect, the smaller-sized carbonaceous material particles that exit the top of the fluidized bed dryer may be approximately 200 microns or smaller. To control the separation of the particle sizes through the fluidized bed dryer, the air flow may be adjusted. A higher air flow velocity through the fluidized bed dryer will produce larger-sized carbonaceous material particles exiting the top of the fluidized bed dryer, while a lower air flow velocity will produce smaller-sized carbonaceous material particles exiting the top of the fluidized bed dryer. In addition, the smaller-sized carbonaceous material particles may be fed into storage container, such as sacks and the like.

In another embodiment, the dryer 402 may be a number of designs so long as there is air flow and carbonaceous material movement, the temperature of the dryer 402 may be preferably in the range from about 100° C. to about 160° C., more preferably from about 120° C. to about 140° C., the temperature may be high enough to drive off most of the moisture and some of the tars in order to liberate the residual fluorine to a level close to the inherent value of the original carbonaceous material.

Figure 6:
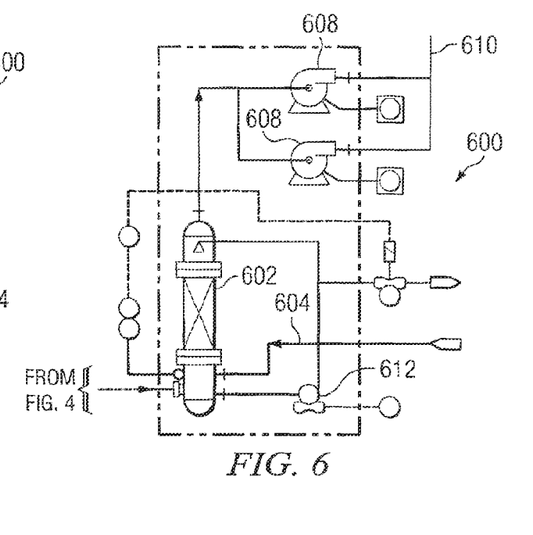
FIG. 6 illustrates a schematic diagram of a vapor recovery unit according to an embodiment of the present invention.

FIG. 6 illustrates an embodiment 600 of a vapor recovery unit 600 according to the present invention. The process water produced by the system for refining carbonaceous material may be fed to a scrubber 602 where air is pulled through the scrubber 602 to remove any additional light volatile vapors from the process water. The air flow through the scrubber 602 is provided by blowers 608 which are fed to a stack 610. The stripped process water may be returned to the top of the scrubber 602 via pump 612. Additionally, the stripped process water may be fed to the moisture balancing unit 346 to be used as a feedstock for increasing the moisture content of the carbonaceous material within the moisture balancing unit 346.

Figure 7:
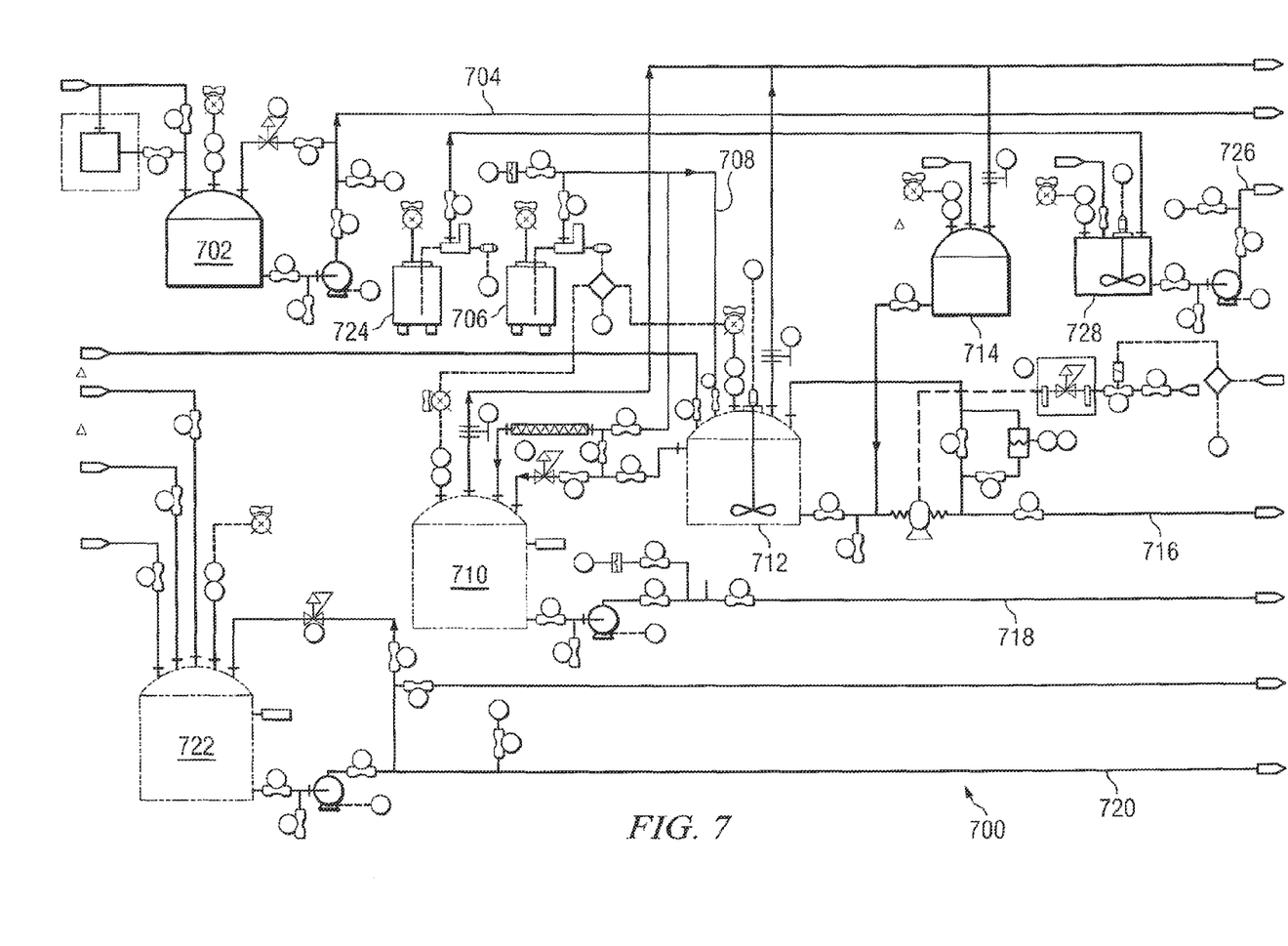
FIG. 7 illustrates a schematic diagram of a feedstock storage unit according to an embodiment of the present invention

FIG. 7 illustrates an embodiment 700 of a feedstock storage unit according to the present invention. The feedstock storage unit 700 includes a de-ionized water storage tank 702 for holding de-ionized water that is used in the system for refining carbonaceous material. For example, de-ionized water is fed from de-ionized water storage tank 702 to centrifuge 328 via pipe 704. Feedstock storage unit 700 further includes a HF storage tank 706 that feeds HF acid via pipe 708 to a HF adjustment tank 710 and a $H_2SiF_6$ adjustment tank 712 may further include heaters to heat their respective acid mixture solutions after blending the acid mixture solution to a desirable strength. The $H_2SiF_6$ adjustment tank 712 may further be fed $H_2SiF_6$ in a more concentrated form that is stored in a $H_2SiF_6$ storage tank 714. Once the desired strength of acid mixture solution is achieved, then it is piped via pipe 716 to digestion vessel 304 for mixing with carbonaceous material. In addition, HF adjustment tank 710 may feed a reduced strength of HF to the centrifuge 328 via pipe 718. Also, feedstock storage unit 700 may further include a rinse water collection tank 722 that contains rinse water collected from the system for refining carbonaceous material. This rinse water may be fed to centrifuge 328 via pipe 720. Additional vessels 724 and 728 may be used to contain caustic compounds, such as bases, for neutralizing any acid spills or reducing the strengths of the acids of the system for refining carbonaceous material. Such bases may be fed to the digestion vessel 304 via pipe 726.

Figure 8:
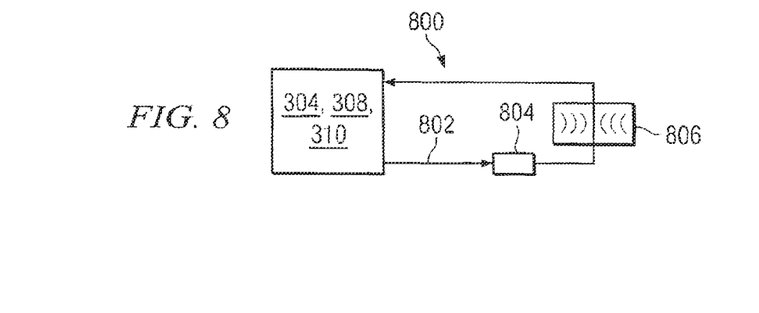
FIG. 8 illustrates a schematic diagram of an ultrasonic unit according to an embodiment of the present invention.

FIG. 8 illustrates an embodiment 800 of an ultrasonic unit according to the present invention. In one embodiment, the digestion vessels 304, 308, and 310 may include a pipe 802 that takes a stream of the carbonaceous material/acid mixture solution and pumps it through the pipe 802 through a source of ultrasonic waves 806 for improved penetration of the acid mixture solution into the micropores and macropores of the carbonaceous material. In one aspect, the source of ultrasonic waves 806 may be a water bath that is subject to a source of such ultrasonic waves, thus imparting the ultrasonic waves through the pipe 802 for improved penetration of the acid mixture solution. In one embodiment, the wave signals are square to improve such penetrating and digesting action.

Figure 9:
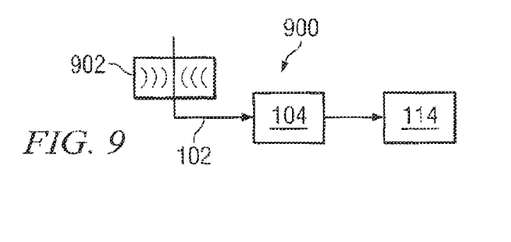
FIG. 9 illustrates a schematic diagram of an ultrasonic unit according to another embodiment of the present invention.

FIG. 9 illustrates an embodiment 900 of an ultrasonic unit according to the present invention. In this embodiment, a source of ultrasonic waves 902 is placed upon the pipe 102 prior to entering the vibratory screen unit 104.

In one embodiment, the frequency of the source of ultrasonic waves 804 and 902 is from about 80 KHz to about 100 KHz. In one example, an opening of a macropore of carbonaceous material may be approximately 1 micron and it has been found that a frequency of 100 KHz source of ultrasonic waves 804 and 902 will cause the acid mixture solution to penetrate the macropore opening. Additionally, as the acid mixture solution is pumped into the macropores of the carbonaceous material, pressure is created within the macropore causing the acid mixture solution to be pumped out once the pressure becomes greater within the macropore than outside the macropore. This pumping action provides for improved penetration and digestion or removal of contaminants in the carbonaceous material. The source of ultrasonic waves 804 and 902 may be generated by ultrasonic transducers as well known in the art. In one aspect, these transducers may be in contact or communication with a water bath, which transfers the wave action to the water, which then transfers the wave action to the pipe, and so on, to provide the pumping action to the micropore and macropores of the carbonaceous material. This reduces the need for mechanical agitation and provides for improved digestion times. The frequency of the source of ultrasonic waves 804 and 902 causes cavitations, cavitation bubbles, and/or cavity bubbles within the acid mixture solution such that they are the size or smaller than the typical openings of the macropores of the carbonaceous material. In general, the higher the frequency the smaller the cavitation bubbles. If the cavitation bubbles are too large, they may tend to pulverize the carbonaceous material to smaller sizes that may not be desirable to the process. In one embodiment, source of ultrasonic waves 804 and 902 are capable of producing power from about 250 watts to about 16,000 watts with a frequency of from about 10 KHz to about 50 KHz. The ultrasonication may be performed at an increased pressure over ambient pressure using a feed pump and adjustable back-pressure valve next to the pipe where it is desired to operate.

Figure 10:
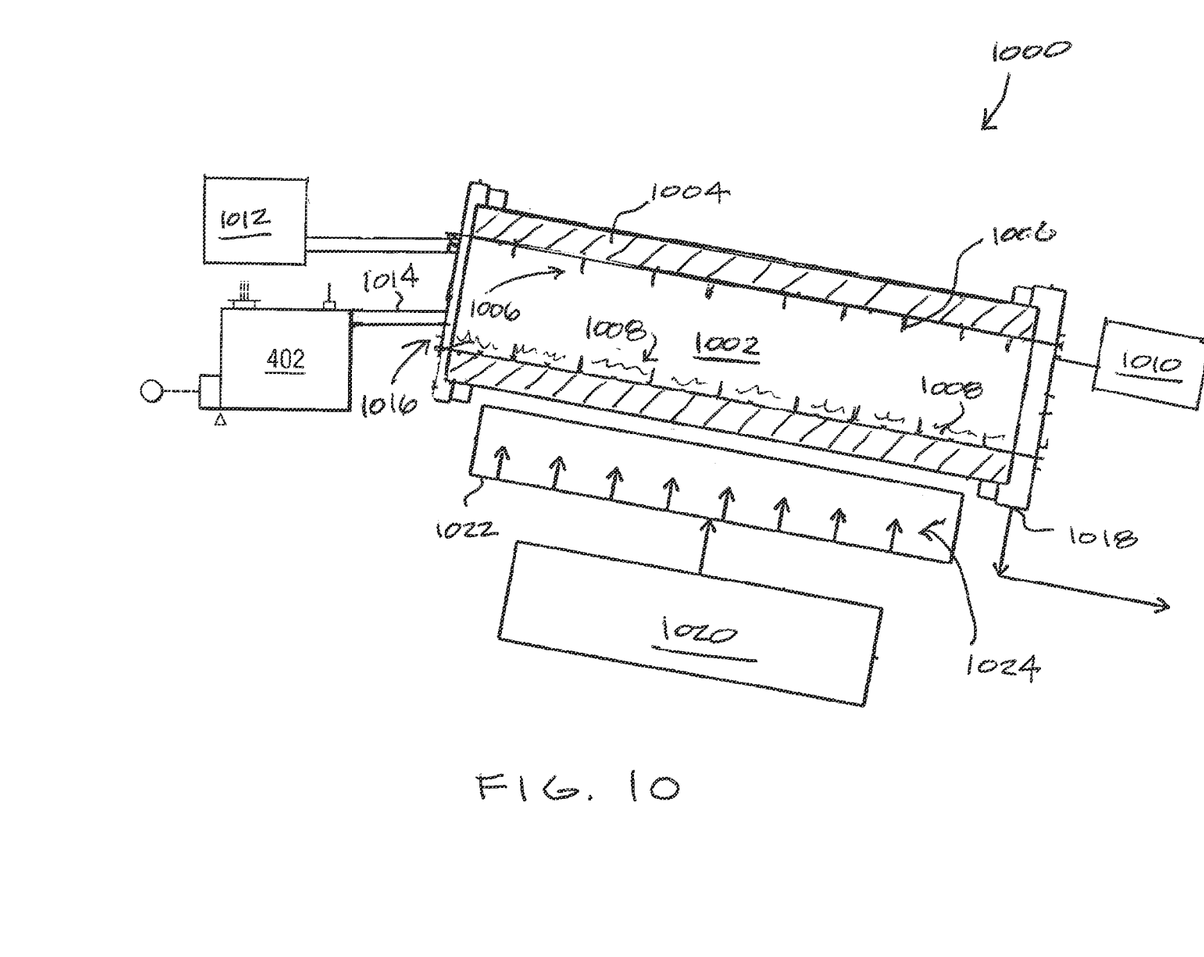
FIG. 10 illustrates a schematic diagram of an activation unit according to embodiment of the present invention.

FIG. 10 illustrates an embodiment 1000 of an activation unit according to the present invention. In this embodiment, a thermal unit, such as rotary kiln 1002 is in communication with drying unit 400 via pipe or conduit 1014, in particular, in communication with dryer 402. Although a rotary kiln 1002 is shown and described, the thermal unit may be a direct-fired kiln, indirect-fired kiln, hearth kilns, multiple hearth kilns, and the like as is know to those skilled in the art. Rotary kiln 1002 includes an inlet 1016 preferably in communication with conduit 1014 and an outlet 1018 where the activated carbonaceous material is discharged for storage or transportation. In one aspect, the dried carbonaceous material is fed by direct loading from dryer 402 into rotary kiln 1002. Direct loading is preferable as it reduces the loss of heat in the dried carbonaceous material, thus reducing the amount of heat needed in the rotary kiln 1002 for activation. In one aspect, rotary kiln 1002 may be directly fired and in another it may be indirectly fired. Rotary kiln 1002 shown in FIG. 10 is indirectly fired or heated by a heat source located outside of the shell of rotary kiln 1002.

Rotary kiln 1002 includes a shell 1004 and a plurality of moving elements 1006 for circulating and moving the carbonaceous material 1008 arranged in the interior of rotary kiln 1002. Moving elements 1006 may, for example, be metal circulation plates or turning plates as commonly known in the art. Moving elements 1006 located in the interior of rotary kiln 1002 are advantageously distributed over the interior of rotary kiln 1002, so that optimum circulation and movement of carbonaceous material 1008 is ensured in the operating state. Moving elements 1006 may, for example, be configured in paddle-form or plate-form, in order to ensure reliable movement and circulation of carbonaceous material 1008. According to one embodiment, moving elements 1006 run at least substantially in the radial direction of rotary kiln 1002, which ensures particularly intensive mixing of carbonaceous material 1008. Moving elements 1006 used may, for example, be metal sheets, in particular angled metal sheets (i.e. angled plates), which move carbonaceous material 1008 in the manner of a paddle. This is known per se to the person skilled in the art.

Rotary kiln 1002 and moving elements 1006 advantageously consist of material which is resistant to high temperature and corrosion, in particular of steel, since they may have to withstand temperature conditions of the activation phase during the production of activated carbonaceous material. Examples of suitable high-temperature-resistant steels which can be used to produce rotary kiln 1002 and/or moving elements 1006 include high-alloy steels, i.e. steels containing more than 5% of alloying elements. Examples of such steels include high-alloy chromium and chromium/nickel steels, preferably with a chromium and/or nickel content of over 10%, in particular over 15%, particularly preferably over 20%, based on the alloy. Ferritic or ferritic-austenitic steels with good high-temperature properties may be preferably used as material for production of rotary kiln 1002 and/or moving elements 1006.

Moreover, rotary kiln 1002 may also have an inlet device 1010 and an outlet device 1012 for introducing and discharging gases and for allowing gases to pass through, for example for the introduction of inert gases for the activation phase during activated carbonaceous material production and for the further introduction of oxidation gases for the activation phase during activated carbon production. Inlet device 1010 and outlet device 1012 are shown such that they may provide a counter-current flow arrangement against the downwardly flowing carbonaceous material 1008, but in another embodiment, the locations or orientation of these devices may be such that they provide a flow pattern in the same direction as the carbonaceous material 1008. Additionally, inlet device 1010 may be a steam injection device to provide steam to the inside of rotary kiln 1002 to create and control the activation burn of the carbonaceous material 1008, for example. In one aspect, the steam may be of a rate of from about 0.25 pounds to about 4 pounds to 1 pound of carbon, more preferably about 3 pounds to 1 pound of carbon, and most preferably about 2 lbs to 1 of carbon. The steam may be injected at any point approximately from the inlet 1016 of the rotary kiln 1002.

Due to the novel size due to the carbonaceous material feedstock production unit 100 and chemical purity due to digestion of the carbonaceous material 1008 feedstock created by any or all of the carbonaceous material feedstock production units 100, microwave drying unit 200, digestion unit 300, and drying unit 400, the carbonaceous material 1008 that is fed into rotary kiln 1002, any or all three parameters of temperature, time, and volume of steam may be easily and efficiently controlled to produce an activated carbonaceous material that consumes less energy than found in conventional systems. Further, outlet device 1012 may recover vaporized coal tars from the carbonaceous material 1008 for further processing, recycling, and possible reuse in gas fired burners 1024. This may occur near inlet device 1010 of rotary kiln 1002 and this step may be referred to as carbonization in one aspect or embodiment. Outlet device 1012 may further include fractional condensation units for fractionating the exhaust stream for recovering the coal tars. Such fractionating may occur in a temperature range of from about 210-250° C. For example, the exhaust stream may be run through a cyclone maintained above 300° C. to capture solids and then condense the stream at or around 220° C. to capture the coal tars. They may then be run through a scrubber to remove and/or neutralize any acids. Further, they may be run into the combustion section of 1002 rotary kiln for thermal destruction of any volatile organic compounds and hazardous air pollutants present, as is known to those skilled in the art.

In another embodiment, more than one rotary kiln 1002 may be used in tandem for providing the activation process to the carbonaceous material. For example, two or three rotary kilns may be used together. Further, a conventional air lock may be employed in a well-known manner between the outlet 1018 and inlet 1016 of rotary kiln 1002 to isolate the internal atmosphere of each rotary kiln 1002 when more than one rotary kiln 1002 is employed, for example.

In one aspect, rotary kiln 1002 may be surrounded by an insulating jacket, not shown, and includes an array of independently controlled gas fired burners, illustrated and generally designated as heat source 1022, which are provided to generate the heat energy transferred through an air space between shell 1004 of rotary kiln 1002 and heat source 1022. While other conventional means may be used as an indirect heat source 1022, such as electric coils, coal, oil, and/or gas fired burners 1024 may be normally considered as the most economically practical source of heat energy in a commercial scale process.

Activation unit 100 may further include a temperature controller 1020 that controls heat source 1022. There are many commercially available, conventional temperature controllers of varying degrees of accuracy available to control the degree of heat energy supplied by the indirect heat source 1022 and operate in a manner well-known to those skilled in the art of industrial rotary kilns.

For purposes of the present system for activating carbonaceous material, the degree of accuracy of temperature controller 1020 chosen should be capable of maintaining the desired temperature profile of the bed of carbonaceous material 1008 traveling through rotary kiln 1002 to obtain useful results in accordance with the teachings of the present system for activating carbonaceous material. Within economically practical limits, reasonably precise control of heat source 1022 provides a greater range of selectivity to affect the properties of the end product in a more reliable manner.

As mentioned above, temperature controller 1020 is operatively connected to heat source 1022 associated with activation unit 1000, and preferably includes suitably positioned temperature sensing devices associated with shell 1004 of rotary kiln 1002 to feed back temperature data to the controller circuitry of temperature controller 1020. Temperature controller 1020 may be set to vary the heat energy generated by gas fired burners 1024 through shell 1004 of rotary kiln 1002 and hence to the bed of carbonaceous material 1008 to provide a predetermined increasing temperature profile or heating ramp of the bed of carbonaceous material 1008 as it advances through rotary kiln 1002.

Preferably, devolatization and activation are generally carried out at temperatures in the range of 350-1,250° C. in particular in the range of 500-900° C., and more preferably in the range of 600-850° C. Generally, rotary kiln 1002 has a slope and rotational speed to provide a residence time for the carbonaceous material of from approximately 10 minutes to approximately 8 hours, preferably from about 30 minutes to about 6 hours, and more preferably from about 60 minutes to about 5 hours.

Once the carbonaceous material 1008 exits rotary kiln 1002 through outlet 1018 it may be cooled, stored, or transported for additional uses. The system for activating carbonaceous material produces a granular-sized carbonaceous material and not powdered-sized product as found with conventional processes that require a binder to achieve this with significant expenses. For example, activated carbonaceous material produced by the system for activating carbonaceous material may be used directly at this point for water filtration applications without further acid wash, as is generally required by other methods.

The present system for activating carbonaceous material preferably produces activated carbonaceous material with a size of from about 200 microns ("μm") to about 2 millimeters ("mm") for granular activated carbon and after pulverizing from about 200 μm to about 10 μm for powdered activated carbon. Additionally, activated carbonaceous material may be coated or infused with an additive, such as bromine, iodine, sulfur, or a number of other products depending on the specific application. For example, activated carbonaceous material may be infused or coated with bromine as a liquid or gas for mercury removal application in flue gas applications. In another example, activated carbonaceous material may be infused or coated with hard sulfur. In one aspect, the temperature of activated carbonaceous material may preferably be at or below 300° C. prior to coating or infusing the activated carbonaceous material with an additive. In one aspect, the additives may be in a vapor phase during the coating or infusion process. In another aspect, the additives may be in a liquid phase during the coating or infusion process. For example, bromine may be applied at a rate of from about 5% to about 30% w/w to the activated carbon in a gas phase via a looped countercurrent flow apparatus as is known in the art.

In addition to the above, the carbonaceous material produced by the system for activating carbonaceous material may be micronized after the application of an additive, such as bromine, to less than 325 sieve size, which is typically 45 μm minus and a mean of around 10 μm for use in a flue gas scrubber to capture mercury, for example.

Figure 11:
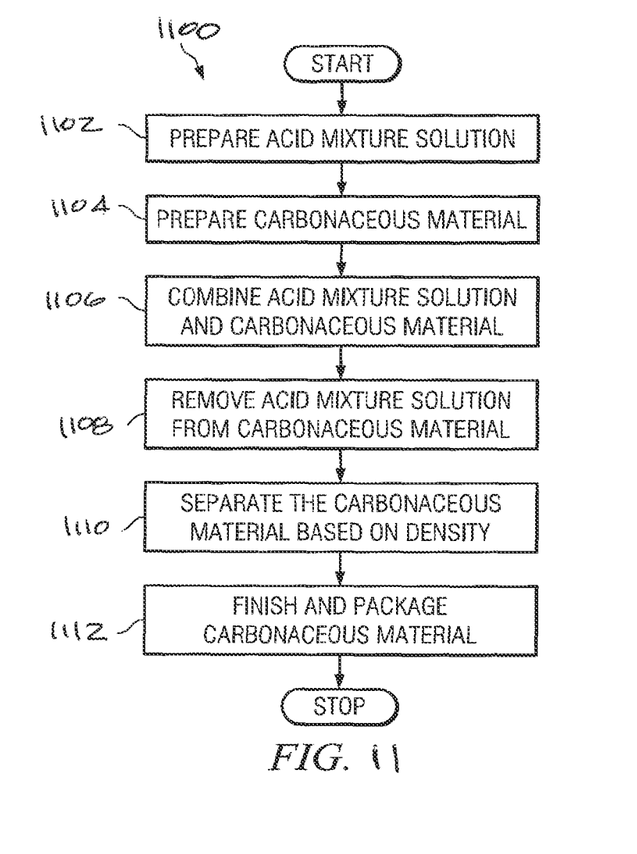
FIG. 11 illustrates a flow diagram for an exemplary process for refining carbonaceous material according to an embodiment of the present invention.

In addition to the aforementioned aspects and embodiments of the present system for activating carbonaceous material, the present invention further includes methods for refining carbonaceous material. FIG. 11 illustrates an embodiment 1100 of a method for refining carbonaceous material. In step 1102, an acid mixture solution is prepared by mixing HF, $H_2O$, and $H_2SiF_6$ to a desired proportion. In this step, stored concentrated HF and $H_2SiF_6$ may be individually pumped to individual vessels where the concentration of each is reduced with water or a base, in one aspect. In another aspect, this step may include a different acid mixture with nitric acid, sulphuric acid, and/or a number of mineral acids as known to those skilled in the art. Then, these reduced concentrations of the HF and $H_2SiF_6$ may be combined into a vessel that then mixes and heats the mixture of HF, $H_2SiF_6$, and $H_2O$. In this step the exact amount of acid mixture solution is prepared for a specific amount of carbonaceous material to be digested.

In step 1104, the carbonaceous material is prepared by sizing a source of carbonaceous material, such as a preparation plant settling pond stream. This step further includes wetting the carbonaceous material with $H_2O$ to a desired content, such as from about 20% to about 30% w/w. This step may further include the application of ultrasonic waves to the carbonaceous material prior to or during the sizing operation.

In step 1106, the carbonaceous material and acid mixture solution are combined in a digestion vessel which is temperature and pressure controlled. This step may further include transferring the carbonaceous material/acid mixture solution to a second digestion vessel for additional digestion time. This step may further include transferring the carbonaceous material/acid mixture solution to a third digestion vessel for addition digestion time. This step may further include the application of ultrasonic waves to the digestion vessel or to a loop or circuit pipe that takes a stream of the carbonaceous material/acid mixture solution out of the digestion vessel and then later inputs it back into the digestion vessel after the application of ultrasonic waves for improved digestion.

In step 1108, the carbonaceous material/acid mixture solution is transferred to a centrifuge for removal of the acid mixture solution. This step may further include spraying rinse water into the centrifuge for washing any residual acid mixture solution from the carbonaceous material. This may be followed by additional centrifuging until the carbonaceous material has a desirable moisture content. This step may also be performed with two or more centrifuges with the assistance of steam to transfer the material from one centrifuge to the next, for example.

In step 1110, the carbonaceous material may be further dried and separated based on densities to achieve the size of desirable product for a particular application or order. This step may include applying an air flow in a vertical vessel such that the less dense carbonaceous material is removed from the top of the dryer while the more dense carbonaceous material is retained in the dryer for removal to a storage vessel, such as a sack. In step 1112, the carbonaceous material is finished and weighed into final storage containers, such as sacks for their intended purpose. The process described herein is scale independent and can be used on a micro-scale, mesa-scale, and macro-scale.

Figure 12:
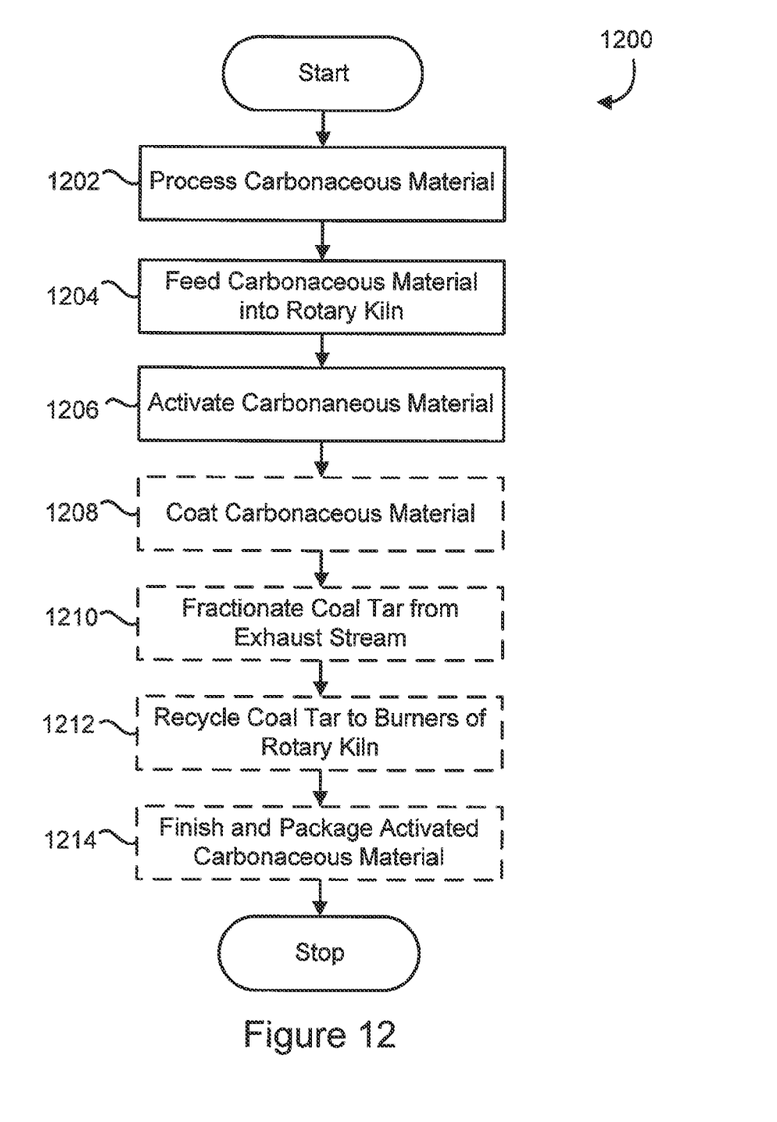
FIG. 12 illustrates a flow diagram for an exemplary process for activating carbonaceous material according to an embodiment of the present invention.

FIG. 12 illustrates an embodiment 1200 of a method for activating carbonaceous material. In step 1202, carbonaceous material is mechanically and chemically processed as disclosed herein. This step may produce a carbonaceous material that has preferable size, purity, and moisture content that is preferable to feeding into activation unit 1000. This step further includes processing the carbonaceous material with the carbonaceous material feedstock production unit 100, microwave drying unit 200, digestion unit 300, and drying unit 400 or a combination of similar machines and/or apparatuses such that the impurities are removed, the moisture content is of a preferred level, and the temperature of the carbonaceous material is elevated, thus reducing the amount of energy required at activation unit 1000 that for conventional processes.

In step 1204, the carbonaceous material is fed from drying unit 400 into rotary kiln 1002 via conduit 1014. Preferably, this step includes feeding digested carbonaceous material from drying unit 400 directly into rotary kiln 1002 so as to not lose any heat provided by the drying unit 400. This feed should be as direct and thermodynamically favorable as possible. By feeding carbonaceous material directly into inlet 1016 of rotary kiln 1002, the carbonaceous material is at an elevated temperature, thus less energy will be required to carbonize and activate the carbonaceous material in the rotary kiln 1002.

In step 1206, the carbonaceous material is activated. According to the present system for activating carbonaceous material, carbonaceous material is fed to rotary kiln 1002 that is pre-heated from about 600° C. to about 850° C., for example. The amount of carbonaceous material fed into rotary kiln 1002 may preferably be from approximately 10% to approximately 30% of the volume of rotary kiln 1002. Rotary kiln 1002 may be subdivided into a carbonizing zone and activating zone, up to a filling volume of from about 5% to about 40%, and carbonized and activated continuously in an inert-gas flow with approximately 8-fold product turnover per kiln rotation and a product temperature profile in the carbonizing zone of from about 300° C. to about 900° C., the residence time being from approximately 10 minutes to approximately 180 minutes, and a carbonaceous material temperature profile in the activating zone of from about 500° C. to about 1,200° C., with a residence time of from about 30 minutes to about 180 minutes, with the addition of from 1 lb to 5 lb of steam to 1 lb of carbon in the activating zone, any distance from inlet 1016 of rotary kiln 1002.

In optional step 1208, activated carbonaceous material may be coated or infused with an additive. This step may be performed in a closed looped countercurrent flow device or apparatus, which may apply from about 5% to about 10% w/w of the preferred additive. In optional step 1210, the coal tar that is released from the carbonaceous material during the activation process may be fractionated. This step may be performed by using a temperature controlled vertical vein condenser at around 200° C. to condense the coal tars yet keeping them in a fluid state so that they will drain from the present system for activating carbonaceous material into a holding vessel and clearing the condenser, for example.

In optional step 1212, the coal tar that has not been fractionated may be recycled to be burned by gas fired burners 1024. The uncaptured vaporized coal tar is returned to the gas fired burners 1024 for further burning by gas fired burners 1024 and subsequent heating of rotary kiln 1002. In optional step 1214, activated carbonaceous material is finished, packaged, and/or stored to be used for further applications as described herein, for example.

There has been described a system for activating carbonaceous material. It should be understood that the particular embodiments described within this specification are for purposes of example and should not be construed to limit the invention. Further, it is evident that those skilled in the art may now make numerous uses and modifications of the specific embodiment described, without departing from the inventive concepts. For example, different temperatures, pressures, acid mixture solution compositions, and the like may be changed or altered to fit within the present system for activating carbonaceous material described herein or other without departing from the inventive concepts.

What is claimed:

1. A system for activating carbonaceous material comprising:
    a carbonaceous material feedstock unit for producing a carbonaceous material of less than 5% mineral content;
    a digestion unit in communication with the carbonaceous material feedstock unit;
    an acid feedstock unit in communication with the digestion unit for providing an acid mixture solution;
    a separation unit in communication with the digestion unit for separating the digested carbonaceous material from the acid mixture solution, the separation unit including a steam source, the steam source configured to provide steam, the steam source configured to vaporize a portion of the acid mixture solution with the steam, and the separation unit including a pipe configured to recover the portion of the acid mixture solution in vapor form;
    a dryer unit in communication with the separation unit for drying the digested carbonaceous material and separating the carbonaceous material; and
    a thermal unit for activating the carbonaceous material to produce activated carbonaceous material, the thermal unit having an inlet for receiving the carbonaceous material from the dryer unit and an outlet for exiting the activated carbonaceous material from the thermal unit.

2. The system for activating carbonaceous material of claim 1, wherein the carbonaceous material feedstock unit produces a carbonaceous material of less than 4% mineral content.

3. The system for activating carbonaceous material of claim 1, wherein the carbonaceous material feedstock unit produces a carbonaceous material of less than 3% mineral content.

4. The system for activating carbonaceous material of claim 1, wherein the carbonaceous material feedstock unit produces a carbonaceous material of less than 2% mineral content.

5. The system for activating carbonaceous material of claim 1, wherein the carbonaceous material feedstock unit produces a carbonaceous material of less than 1% mineral content.

6. The system for activating carbonaceous material of claim 1, wherein the thermal unit further comprises:
a source of at least one of carbon dioxide and steam located substantially adjacent to an inlet of a rotary kiln for injecting the at least one of carbon dioxide and steam to contact the carbonaceous material contained in the thermal unit.

7. The system for activating carbonaceous material of claim 1, wherein the thermal unit is selected from the group consisting of indirect-fired kilns, direct-fired kilns, hearth kilns, and multiple hearth kilns.

8. The system for activating carbonaceous material of claim 1, wherein one or more heat sources are capable of operating the thermal unit at a temperature from about 350° C. to about 1,250° C.

9. The system for activating carbonaceous material of claim 1, wherein one or more heat sources are capable of operating the thermal unit at a temperature from about 500° C. to about 900° C.

10. The system for activating carbonaceous material of claim 1, wherein one or more heat sources are capable of operating the thermal unit at a temperature from about 600° C. to about 850° C.

11. The system for activating carbonaceous material of claim 1, wherein the thermal unit provides a residence time of from about 30 minutes to about 8 hours for the carbonaceous material.

12. The system for activating carbonaceous material of claim 1, further comprising:
a fractionation unit in communication with the thermal unit for fractionating coal tar from the carbonaceous material.

13. The system for activating carbonaceous material of claim 12, further comprising:
a recycle conduit located between the fractionation unit and the thermal unit for recycling the coal tar as a fuel gas.

14. A system for activating carbonaceous material comprising:
a carbonaceous material feedstock unit comprising:
a first vibratory screen unit for sizing the carbonaceous material to a desired size and a density differential separation apparatus in communication with the first vibratory screen unit for producing a carbonaceous material of less than 5% mineral content;
a digestion unit in communication with the carbonaceous material feedstock unit;
an acid feedstock unit in communication with the digestion unit for providing an acid mixture solution to the first digestion unit comprising:
a source of $H_2O$;
a source of HF;
a source of $H_2SiF_6$, wherein the HF, $H_2SiF_6$, and $H_2O$ are mixed together in predetermined ratios to form the acid mixture solution prior to being provided to a first digestion unit;
a separation unit in communication with the digestion unit for separating the digested carbonaceous material from the acid mixture solution, the separation unit including a steam source, the steam source configured to provide steam from a temperature of 105° C. to about 120° C., the steam source configured to vaporize a portion of the acid mixture solution with the steam, and the separation unit including a pipe configured to recover the portion of the acid mixture solution in vapor form;
a dryer unit in communication with the separation unit for drying the digested carbonaceous material and separating the carbonaceous material; and
a rotary kiln having a shell defining an internal chamber for activating the carbonaceous material to produce activated carbonaceous material, the rotary kiln having an inlet for receiving the carbonaceous material from the dryer unit and an outlet for exiting the activated carbonaceous material from the rotary kiln.

15. The system for activating carbonaceous material of claim 14, further comprising:
a conduit directly connecting the dryer unit with the inlet of the rotary kiln.

16. The system for activating carbonaceous material of claim 14, wherein the rotary kiln further comprises:
a source of at least one of carbon dioxide and steam source located substantially adjacent to the inlet of the rotary kiln for injecting the at least one carbon dioxide and steam into the internal chamber of the rotary kiln.

17. The system for activating carbonaceous material of claim 14, further comprising:
a halogenation unit located downstream of the outlet of the rotary kiln for contacting the activated carbonaceous material with a halogenated compound.

18. The system for activating carbonaceous material of claim 17, wherein the halogenation unit is a bromination unit for contacting the activated carbonaceous material with a brominated compound.

19. The system for activating carbonaceous material of claim 17, wherein the brominated compound is in a liquid phase.

20. The system for activating carbonaceous material of claim 14, wherein a heat source is capable of operating the rotary kiln at a temperature from about 500° C. to about 900° C.

21. The system for activating carbonaceous material of claim 14, further comprising:
a fractionation unit in communication with the rotary kiln for fractionating coal tar from the carbonaceous material.

22. The system for activating carbonaceous material of claim 21, further comprising:
a recycle conduit located between the fractionation unit and the rotary kiln for recycling the coal tar as a fuel gas.

* * * * *